(12) United States Patent
Masuda et al.

(10) Patent No.: US 6,364,195 B1
(45) Date of Patent: Apr. 2, 2002

(54) BRAZING APPARATUS

(75) Inventors: Tsugunori Masuda; Junichi Onozaki; Hiroshi Saito, all of Saitama (JP)

(73) Assignee: Kabushiki Kaisha Tamura Seisakusho (JP)

( * ) Notice: Subject to any disclaimer, the term of this patent is extended or adjusted under 35 U.S.C. 154(b) by 0 days.

(21) Appl. No.: 09/564,391

(22) Filed: May 1, 2000

Related U.S. Application Data

(63) Continuation-in-part of application No. 09/011,295, filed as application No. PCT/JP97/01984 on Jun. 10, 1997, now abandoned.

(30) Foreign Application Priority Data

Jun. 11, 1996 (JP) .............................................. 8-149593

(51) Int. Cl.[7] .......................... B23K 1/08; B23K 37/06; B23K 31/02
(52) U.S. Cl. .......................................... 228/37; 45/260
(58) Field of Search .............................. 228/33, 37, 45, 228/256, 260

(56) References Cited

U.S. PATENT DOCUMENTS

| | | | | |
|---|---|---|---|---|
| 3,941,088 A | * | 3/1976 | Ronafoldi et al. |
| 4,171,761 A | * | 10/1979 | Boldt et al. |
| 4,392,786 A | * | 7/1983 | Merenkov et al. |
| 4,465,219 A | * | 8/1984 | Kondo |
| 4,476,805 A | * | 10/1984 | Higuchi et al. |
| 4,523,708 A | * | 6/1985 | Minchev et al. |
| 4,530,458 A | * | 7/1985 | Kondo |
| 4,568,012 A | * | 2/1986 | Kakuhata et al. |
| 4,724,994 A | * | 2/1988 | Flury |
| 4,802,617 A | * | 2/1989 | Deambrosio |
| 4,824,010 A | * | 4/1989 | Inoue et al. |
| 5,203,489 A | * | 4/1993 | Gileta et al. |
| 5,228,614 A | * | 7/1993 | Elliott et al. |
| 5,240,169 A | * | 8/1993 | Gileta |
| 5,332,939 A | * | 7/1994 | Fanning et al. |
| 5,630,542 A | * | 5/1997 | Hendrikx |
| 5,725,143 A | * | 3/1998 | Leturmy |
| 5,816,474 A | * | 10/1998 | Flury |
| 5,981,922 A | * | 11/1999 | Masuda et al. |
| 6,050,473 A | * | 4/2000 | Masuda et al. |
| 6,082,606 A | * | 7/2000 | Leturmy |
| 6,223,969 B1 | * | 5/2001 | Leturmy |

FOREIGN PATENT DOCUMENTS

| | | | |
|---|---|---|---|
| EP | 0058766 A2 | * | 9/1982 |
| EP | 109988 A | * | 6/1984 |
| EP | 0849023 A1 | * | 6/1998 |
| JP | 410190206 A | * | 7/1998 |

* cited by examiner

*Primary Examiner*—Tom Dunn
*Assistant Examiner*—Kiley Stoner
(74) *Attorney, Agent, or Firm*—Morrison Law Firm

(57) ABSTRACT

A first electromagnetic induction pump is disposed in a first reservoir, and a second electromagnetic induction pump is disposed in a second, independent, reservoir. Each reservoir is adapted to contain molten brazing filler metal. The electromagnetic induction pumps are effective to eject the brazing filler metal upward through wave forming portions into contact with an underside of a workpiece being conveyed along a workpiece conveyance path. The second reservoir is disposed downstream of the first reservoir in the direction of conveyance. At least one of the first and second reservoirs include a height adjusting device which permits adjusting the relative heights of the wave forming portions to adapt to the needs of the workpiece. The apparatus may be adapted to contain an intermediate space and an intermediate processing device between the reservoirs. In addition, a brazing apparatus having a plurality of reservoir may have local nozzles fitted on the reservoirs effective to direct brazing filler metal to respective local areas of a workpiece. The apparatus having local nozzles may include an interference preventing space between the nozzles.

13 Claims, 12 Drawing Sheets

US 6,364,195 B1

BRAZING APPARATUS

This application is a CIP of Ser. No. 09/011,295 filed Dec. 16, 1998, now abandoned. Which is a 371 of PCT/JP97/011,984 Jun. 10, 1997.

BACKGROUND OF THE INVENTION

The present invention relates to a brazing apparatus using an electromagnetic induction pump. More specifically, the present invention relates to a brazing apparatus having a plurality of reservoirs for brazing filler metal, wherein the height of the reservoirs may be adjusted independently. The present invention also relates to a brazing apparatus having an intermediate processing space capable of accommodating an intermediate processing device such as a warp correcting device or a flux applying device. The present invention also relates to a brazing apparatus having a plurality of reservoirs fitted with local nozzles capable of soldering a local area of a workpiece. In this latter arrangement, there is no restriction as to the orientation of the reservoirs with respect to each other and multiple workpieces may be processed simultaneously.

FIG. 15 shows the general structure of a conventional wave soldering device, wherein a work conveyor 14 adapted to convey workpieces to be soldered, such as component-mounted substrates or the like, extends from a workpiece inlet 12 to a workpiece outlet 13 of a device cover 11.

A fluxer 15 for applying foamed flux to workpieces, a preheater 16 for preheating the workpieces, a solder bath 17 for soldering the workpieces by using molten solder ejected from wave nozzles, and a fan 18 for cooling the workpieces after soldering are arranged in this order along the conveyor 14.

A primary wave nozzle 21a and a secondary wave nozzle 21b are disposed in the solder bath 17. A wave-forming plate 22 has numerous ejection holes is disposed at the open top of the primary wave nozzle 21a. The primary wave nozzle 21a is adapted to feed molten solder over the entire workpiece, covering every corner of the electrode portions and other parts of chip components by means of numerous small primary waves W1 which are ejected as irregular spouts from the ejection holes of the wave-forming plate 22. The secondary wave nozzle 21b is adapted to adjust the shapes of soldered parts by means of gentle secondary waves W2.

As shown in FIG. 16, the solder bath 17 is provided with a pressure duct 23 fitted in an opening at the bottom of the nozzle body 21 of the wave nozzles 21a,21b, and a pump impeller 24 disposed at the end of the pressure duct 23. The solder bath 17 also includes a suction opening 25 and a motor drive mechanism 26 associated with the pump impeller 24.

Molten solder introduced from the suction opening 25 as a result of rotation of the pump impeller 24 is fed under pressure through the pressure duct 23 into the nozzle body 21 and emitted from the nozzle body 21 in waves so that the undersides of workpieces P, which may be component-mounted substrates, are soldered while they are conveyed, being held between conveyor claws 27 of the conveyor 14. The major part of the solder waves directly returns onto the molten solder surface 28 in the solder bath 17 and is circulated into the suction opening 25 of the pump impeller 24.

Various brazing apparatuses using an electromagnetic pump are disclosed in, for example, Japanese Patent Publication Nos. 42590-1976, 31628-1990 and 60581-1991, and Japanese Utility Model Publication No. 17572-1988. Electromagnetic pumps used in those brazing apparatuses are either a direct current type or an alternating current type.

A direct-current type electromagnetic pump is adapted to generate a thrusting force to a conductive brazing filler metal, such as tin, over its path of motion by applying a magnetic field perpendicularly to the path of the conductive brazing filler metal and feeding direct electric current perpendicularly to both the path of motion and the magnetic field.

An alternating-current type electromagnetic pump is an electromagnetic induction pump which includes induction coils arranged on a plane along a path traveled by a conductive brazing filler metal and is adapted to generate a thrusting force to the brazing filler metal by feeding AC current having lagged phases to the induction coils, thereby generating a shifting magnetic field in the path traveled by the conductive brazing filler metal to permit the electromagnetic induction to generate electromotive force on the conductive brazing filler metal in its path of motion so that electric current generated by the electromotive force of the brazing filler metal flows in the magnetic flux in the magnetic field.

With a wave soldering device of a type which calls for force-feeding molten solder by means of a pump impeller rotated by a conventional motor drive mechanism, it is difficult to reduce the amount of solder, because of structural limitations in how small the solder bath can be.

To be more precise, as the solder bath has 17 to be sufficiently deep in order to prevent oxidized solder from being entangled in the portion where the impeller is turning, the volume of the entire solder bath 17 becomes large.

On the other hand, although a conventional brazing apparatus which calls for force-feeding brazing filler metal by using an electromagnetic pump and ejecting it in the form of waves requires less brazing filler metal compared with the wave soldering device described above, it occupies a considerable space along the conveyance path of workpieces.

For this reason, unlike a motor-driven wave soldering device, no conventional electromagnetic pump type brazing apparatus has ever employed the art that calls for serially arranging two brazing apparatus and performing two kinds of brazing by means of primary waves and secondary waves.

Simply arranging two conventional electromagnetic pump type brazing apparatuses to be used respectively for primary brazing and secondary brazing would not only double the surface area of the device, which would tale up too much space, but also require twice as much brazing filler metal.

Due to environmental protection regulations, the demands for brazing filler metal which does not contain lead (what is generally called lead-free solder) are recently on the increase. As lead-free solders are made of materials such as indium or the like, which are 3 to 10 times as expensive as ordinary solder made of tin and lead, it is necessary to reduce the quantity of the brazing filler metal to be used as much as possible.

OBJECTS AND SUMMARY OF THE INVENTION

In order to solve the above problems, an object of the present invention is to provide an electromagnetic pump type brazing apparatus which is capable of forming waves at a plurality of locations without taldng up much space. Another object of the present invention is to provide an electromagnetic pump type brazing apparatus which is capable of reducing the quantity of brazing filler metal.

Briefly stated, the present invention is a brazing apparatus having at least a first and second reservoir for holding a brazing filler metal. The first and second reservoirs are disposed along a predetermined conveyance path of a workpiece. A first nozzle is disposed on and in communication with the first reservoir and ejects a first wave of brazing filler metal from the first reservoir. A second nozzle is disposed on and in communication with the second reservoir and ejects a second wave of brazing filler metal from the second reservoir. A means for adjusting the height of the first and second reservoirs allows for the height of the reservoirs to be adjusted independently from one another.

In an embodiment of the present invention, a brazing apparatus is provided including a plurality of reservoirs adapted to contain brazing filler metal, and a plurality of electromagnetic induction pumps adapted to braze workpieces by ejecting upward the brazing filler metal contained in the reservoirs, said reservoirs arranged along the predetermined conveyance path of workpiece and having vertically extending vertical plate portions in the shape of a plate, and the electromagnetic induction pumps disposed respectively along specified vertical plate portions of the reservoirs.

With the configuration as above, providing a plurality of reservoirs enables the brazing based on different criteria for the respective reservoirs, and the plurality of electromagnetic induction pumps installed along vertical plate portions of the respective reservoirs take up only a limited space so that a compact brazing apparatus which is capable of forming more than one type of waves is provided.

According to another feature of the invention, a reservoir of the brazing apparatus includes a pump reservoir portion which is vertically installed and provided with an electromagnetic induction pump, and a wave forming portion which is formed above the pump reservoir portion and adapted to form waves.

As each pump reservoir portion including an electromagnetic induction pump is so disposed as to extend vertically, with a wave forming portion formed above the pump reservoir portion, the quantity of brazing filler metal to be contained in the reservoir can be reduced.

According to another feature of the invetion, each electromagnetic induction pump of brazing apparatus comprises a first iron core disposed in contact with the outer side face of a vertical plate portion, an induction coil wound around the first iron core, a second iron core dissposed in parallel to the inner side face of the vertical plate portion and the second iron core.

As the first iron cores around which the induction coils are wound are disposed outside the vertical plate portions of the respective reservoirs, maintenance of the induction coils or a similar operation can be easily done from the outside.

According to yet another feature of the invention, the brazing apparatus includes separate sets of heaters which are disposed in the plurality of reservoirs.

With the configuration as above, the temperatures of the brazing filler metal in the reservoirs can be respectively and independently controlled whenever such a separate control is necessary.

In addition, according to another feature of the invention, the brazing apparatus includes a plurality of removable nozzles which are respectively disposed on the electromagnetic induction pumps and are adapted to eject brazing filler metal therefrom.

With the configuration as above, maintenance of the nozzles themselves or cleaning of the inside of an electromagnetic induction pump can be easily done by removing the nozzle.

According to yet another feature of the invention, the brazing apparatus includes height adjusting means for adjusting the height of a reservoir or the heights of reservoirs.

With the configurations as above, in cases where the inclination of the workpiece conveyance path has been changed or where a height adjustment has otherwise become necessary, the optimal distances between workpiece and waves can be obtained by adjusting the relative heights of the reservoirs with respect to one another or adjusting the absolute heights of the reservoir from a given installation surface.

According to an embodiment of the invention, a brazing apparatus is provided comprising a first reservoir for holding a brazing filler metal. The first reservoir is disposed underneath a workpiece. There is also a second reservoir for holding a brazing filler metal. The second reservoir is disposed adjacent to the first reservoir. A first local nozzle is disposed on and in communication with the first reservoir, for ejecting upwardly a first wave of brazing filler metal from the first reservoir. A second local nozzle is disposed on and in communication with the second reservoir, for ejecting upwardly a second wave of said brazing filler metal from said second reservoir. An interference preventing space is located between the first and second local nozzles and is effective to prevent interference between a workpiece and the local nozzles and between multiple workpieces being brazed simultaneously. A means for adjusting the height of said first and second reservoirs to allow said height of each of said first and second reservoirs to be adjusted independently is provided. Finally, a means for adjusting the position of the workpiece relative to the first and second reservoirs is provided.

DETAILED DESCRIPTION OF THE PREFERRED EMBODIMENTS

Figure 1:
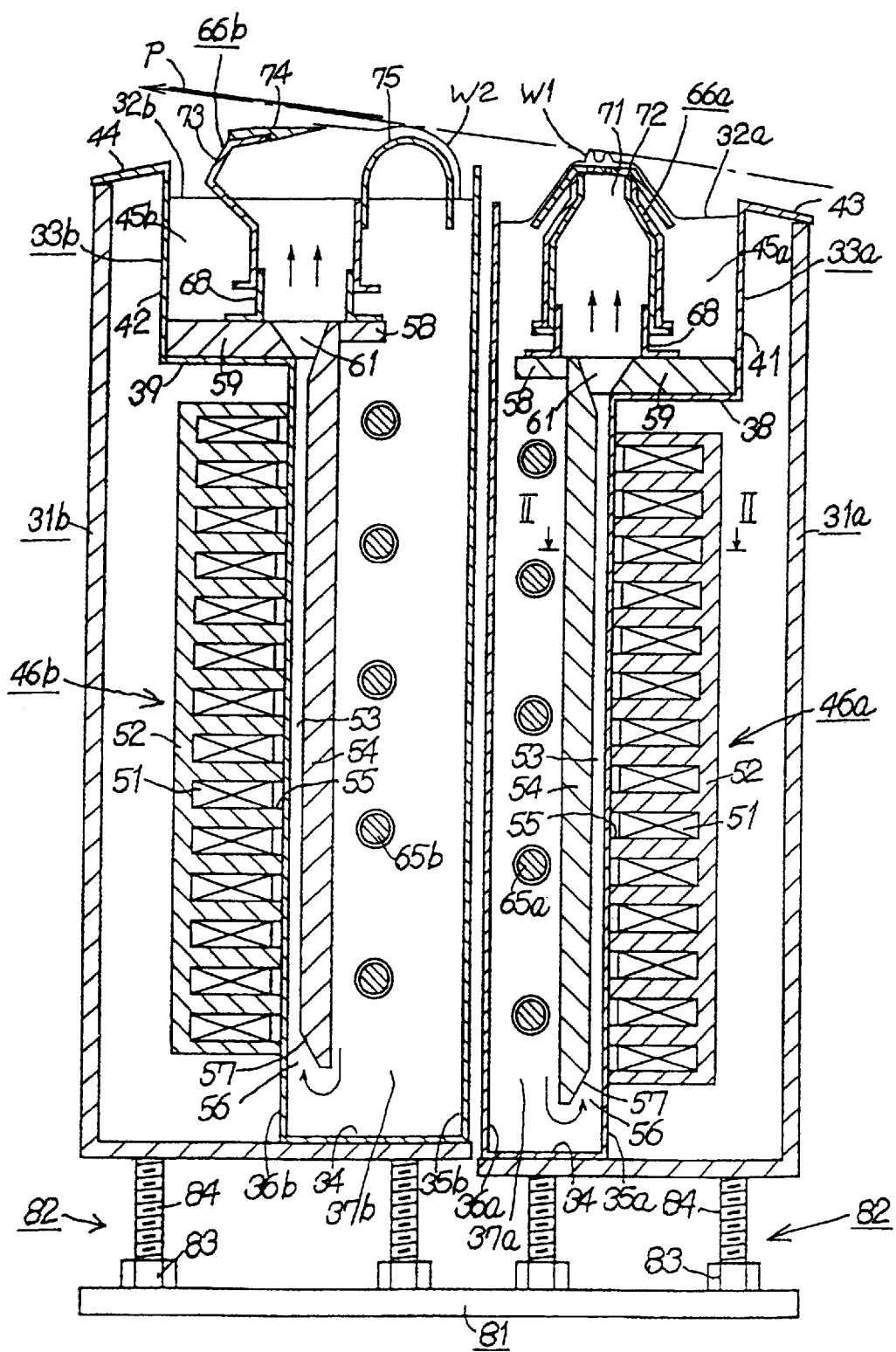
FIG. 1 is a sectional view of a brazing apparatus according to a first embodiment of the invention.

As shown in FIG. 1, a first device body 31a at the workpiece inlet side and a second device body 31b at the workpiece outlet side are arranged in such a manner that their heights, i.e. their respective distances from a base 81 of the brazing apparatus, can be adjusted by height adjusting means 82.

The height adjusting means 82 are comprised of a plurality of nuts 83 disposed on the base 81 and a plurality of bolts 84 attached to the underside of the device bodies 31a, 1b and screwed in the nuts 83.

A first reservoir 33a adapted to contain conductive brazing filler metal 32a, which may be tin, indium or the like, is disposed in the device body 31a located at the workpiece inlet side, while a second reservoir 33b adapted to contain conductive brazing filler metal 32b similar to the above is disposed in the device body 31b at the workpiece outlet side.

The first reservoir 33a comprises a vertically elongated pump reservoir portion 37a and a wave forming reservoir portion 45a which projects toward the workpiece inlet side from the pump reservoir portion 37a. The pump reservoir portion 37a is comprised of a bottom plate portion 34, a vertical plate portion 35a located at the workpiece inlet side, a vertical plate portion 36a located at the workpiece outlet side, and vertical plate portions (not shown) which are located at the lateral sides of the reservoir with respect to the predetermined path of conveyance of workpieces. The wave forming reservoir portion 45a is comprised of the upper portion of the vertical plate portion 36a at the workpiece outlet side, a horizontal plate portion 38 which integrally extends from the upper portion of the vertical plate portion 35a at the workpiece inlet side towards the workpiece inlet end of the device, a vertical plate portion 41 integrally extending upward from the horizontal plate portion 38, an upper rim portion 43 integrally extending from the vertical plate portion 41, and vertical plate portions (not shown) which are located at the lateral sides of the reservoir with respect to the direction in which workpieces are conveyed. Each vertical plate portion mentioned above is a vertically extending plate-shaped member.

In the same manner as above, the second reservoir 33b comprises a vertically elongated pump reservoir portion 37b and a wave forming reservoir portion 45b which projects toward the workpiece outlet side from the pump reservoir portion 37b. The pump reservoir portion 37b is comprised of a bottom plate portion 34, a vertical plate portion 35b located at the workpiece inlet side, a vertical plate portion 36b located at the workpiece outlet side, and vertical plate portions (not shown) which are located at the lateral sides of the reservoir with respect to the direction in which workpieces are conveyed. The wave forming reservoir portion 45b is comprised of the upper portion of the vertical plate portion 35b at the workpiece inlet side, a horizontal plate portion 39 which integrally extends from the upper portion of the vertical plate portion 36b at the workpiece outlet side towards the workpiece outlet end of the device, a vertical plate portion 42 integrally extending upward from the horizontal plate portion 39, an upper rim portion 44 integrally extending from the vertical plate portion 42, and vertical plate portions (not shown) which are located at the lateral sides of the reservoir with respect to the direction in which workpieces are conveyed. Each vertical plate portion mentioned above is a vertically extending plate-shaped member.

The reservoirs 33a, 3b are respectively provided with a first electromagnetic induction pump 46a and a second electromagnetic induction pump 46b. The first electromagnetic induction pump 46a vertically extends along the vertical plate portion 35a at the workpiece inlet side of the first reservoir 33a, while the second electromagnetic induction pump 46b vertically extends along the vertical plate portion 36b at the workpiece outlet side of the second reservoir 33b.

The first electromagnetic induction pump 46a is formed by disposing a first iron core 52, around which an induction coil 51 is wound, in contact with the outer surface of the vertical plane portion 35a at the workpiece inlet side of the first resivoir 33a and disposing a second iron core 54 at the inner side of the vertical plane portion 35a with a gap therebetween to permit the brazing filler metal to rise.

The second electromagnetic induction pump 46b is likewise formed by disposing a first iron core 52, around which is a induction coil 51 is wound, in contact with the outer surface of the vertical plate portion 36b at the workpiece outlet side of the second resivor 33b and disposing a second iron core 54 at the inner side of the vertical plate portion 36b in such a manner as to external parallel to the vertical plate 36b with a gap 53 therebetween.

The second electromagnetic induction pump 46b is likewise formed by disposing a first iron core 52, around which an induction coil 51 is wound, in close contact with the outer surface of the vertical plate portion 36b at the workpiece outlet side of the second reservoir 33b and disposing a second iron core 54 at the inner side of the vertical plate portion 36b in such a manner as to extend parallel to the vertical plate portion 36b with a gap 53 therebetween.

The first iron core 52 at each side of the device is formed by arranging numerous thin iron plates in the widthwise direction (as viewed in FIG. 1, the direction perpendicularly intersecting the sheet of the drawing) in such a manner that their numerous grooves 55 open toward the associated vertical plate portion 35a or 36b are vertically aligned, each groove facing toward a groove of the first iron core 52 at the opposite side, and placing an induction coil 51 in these grooves 55 so as to extend along the grooves in the state it is wound around, the extended portions of these grooves at appropriate intervals.

The second iron core 54 at each side of the device includes a slanted face portion 57 which forms a suction opening 56 at the bottom of the iron core, nozzle mount portions 58,59 integrally formed at the top of the iron core, and a discharge opening 61 which is so formed at the base of the nozzle mount portion 59 as to open upward. Each nozzle mount portion 59 removably rests on the top of the associated horizontal plate portion 38 or 39 of the reservoir.

In cases where a first iron core 52 having an induction coil 51 wound therearound is disposed outside each respective reservoir 33a, 3b as is true in the embodiment shown in FIG. 1, maintenance of the induction coils 51 and other components can be easily done from outside by opening inspection doors (not shown) or through other accessing means of the device bodies 31a, 31b.

Figure 2:
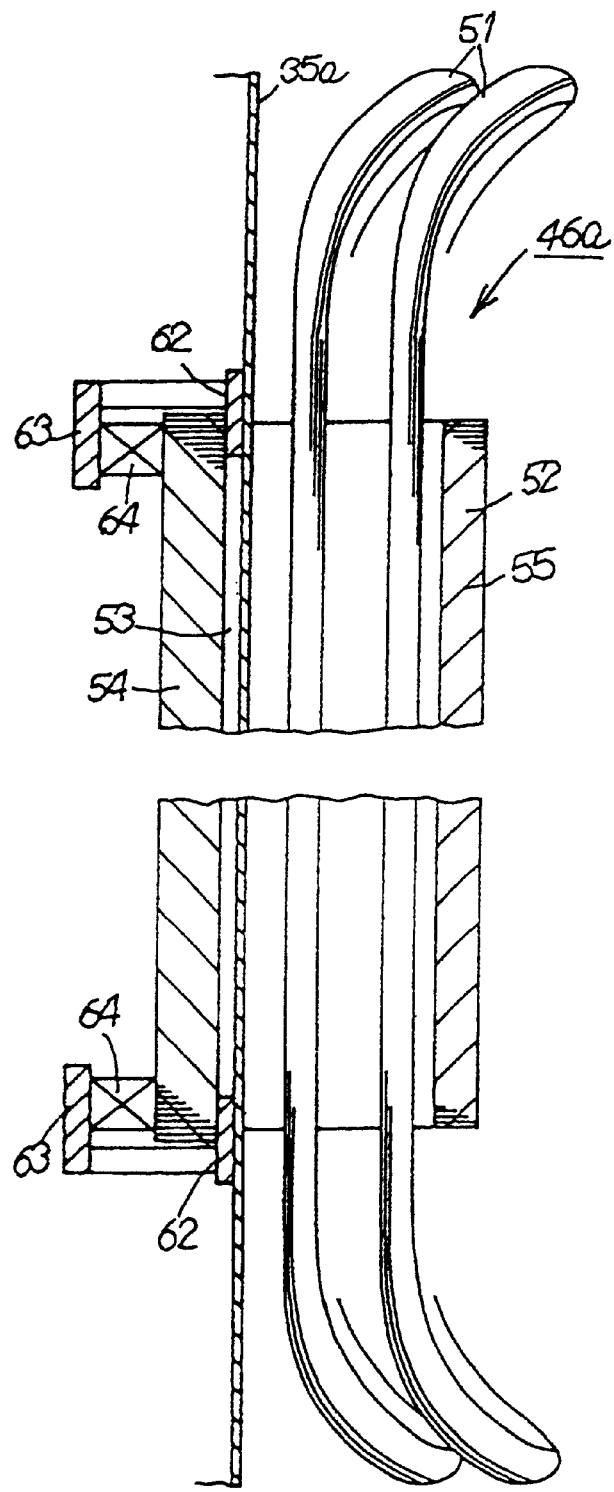
FIG. 2 is a sectional view taken on line II—II of FIG. 1.

As shown in FIG. 2, together with spacers 62, each flat, plate-shaped second iron core 54 forms a brazing filler metal rising gap 53 between the iron core and the associated vertical plate portion 35a or 36b. Further, each second iron core 54 is secured by a pressing mechanism 64 which may be springs or the like disposed between the spacers 62 and end plates 63 provided opposite the spacers 62.

Referring again to FIG. 1, a plurality of heaters 65a for melting brazing filler metal 32a are vertically arranged in the pump reservoir portion 37a of the first reservoir 33a, while another set of heaters 65b for melting brazing filler metal 32b are vertically arranged in the pump reservoir portion 37b of the second reservoir 33b. These heaters 65a, 65b are sheathed type heaters which are elongated in the widthwise direction (as viewed in FIG. 1, the direction perpendicularly intersecting the sheet of the drawing) and inserted into the reservoirs.

A first nozzle 66a adapted to eject the brazing filler metal 32a is removably disposed above the first electromagnetic induction pump 46a, and a second nozzle 66b adapted to eject the brazing filler metal 32b is removably disposed above the second electromagnetic induction pump 46b.

To be more specific, nozzle mounting plates 68 are respectively affixed to the nozzle mounts 58, 59 of the second iron cores 54 at the workpiece inlet side and the workpiece outlet side, and the first nozzle 66a and the second nozzle 66b are removably fitted over the respective nozzle mounting plates 68.

The first nozzle 66a is provided with a wave-forming plate 72 attached to an aperture 71 at the top of the first nozzle 66a, the wave-forming plate 72 including numerous ejection holes bored therein in order to form numerous primary waves W1 to be spouted in the shape of protrusions which will move irregularly.

The second nozzle 66b is adapted to form smooth secondary waves W2 by means of a directing plate 73 bent in the direction opposite the direction in which workpieces P are conveyed, a directing fin 74 projecting from the tip of the directing plate 73 in the direction opposite the conveyance direction, and a guide plate 75 having a cross section in the shape of the inverted U and attached to the opposite side of the nozzle.

Next, the function of the embodiment shown in FIG. 1 is explained hereunder. The heights of waves, i.e. the distances between the waves and workpieces are adjusted, when the inclination of the conveyance path of workpiece P, which is represented by a chain line in the drawings, has been changed or in cases where such an adjustment has otherwise become necessary. In such an event, the adjustment is done by raising or lowering at least one of the two device bodies 31a, 31b by rotating the nuts 83 or the bolts 84 of the corresponding height adjusting means 82 in order to adjust either the relative heights of the reservoirs 33a, 33b (the difference between the heights of the reservoirs 33a, 33b) or the absolute distances between the device base 81 and the respective reservoirs 33a, 33b.

The first and second electromagnetic induction pumps 46a, 46b supply AC current having lagged phases, such as three-phase AC current, to the induction coils 51 which are vertically arranged along the brazing filler metal rising gaps 53. The lagged phases generate shifting magnetic fields in the respective brazing filler metal rising gaps 53 so that the electromagnetic induction generates electromotive force on the conductive brazing filler metal 32a, 32b in the brazing filler metal rising gaps 53. As a result, electric current generated by the electromotive force of the brazing filler metal flows in the magnetic flux in each magnetic field and thereby generates upward thrusting force on the brazing filler metal 32a, 32b so that the brazing filler metal moves upward.

The brazing filler metal 32a, 32b is melted by the heaters 65 and introduced through the suction openings 56 by the respective electromagnetic induction pumps 46a, 46b, and moves up the brazing filler metal rising gaps 53 along the vertical plate portion 35a at the workpiece inlet side of the first reservoir 33a and the vertical plate portion 36b at the workpiece outlet side of the second reservoir 33b. The brazing filler metal 32a, 32b is then discharged from the respective discharge openings 61 and emitted as the primary wave W1 through the first nozzle 66 and as the secondary wave W2 through the second nozzle 66b. Then, after components are brazed onto the surfaces of the substrates of the workpiece P that are successively carried into and out of the waves W1 and W2, the brazing filler metal 32 falls back into the wave forming reservoir portion 45 and circulates into the pump reservoir portions 37a, 37b.

As the brazing filler metal rising gaps 53 are formed straight, without a bent portion, the height of the first and second waves W1, W2 can be easily made uniform along the entire widths of the reservoirs 33a, 33b. The width mentioned above means the dimension in the direction perpendicular to the sheet of FIG. 1.

The primary waves W1, which are in the shape of small protrusions moving in an irregular fashion, are capable of entering into every gap of micro components on a substrate packaged with a high density, ensuring excellent coverage of every brazed portion, while smooth, arc-shaped secondary waves W2 smooth out excessive brazing, thereby preventing defects such as so-called bridges, icicles, etc.

Whenever it is necessary, both the first and second nozzles 66a, 66b can be removed from the nozzle mounting plates 68, which are integrally formed with the respective second iron cores 54, in order to conduct maintenance of the nozzles 66a,66b themselves or clean the interiors of the brazing filler metal rising gaps 53 of the electromagnetic induction pumps 46a, 46b.

When the first nozzle 66a or the second nozzle 66b is removed, the top of the discharge opening 61 of the associated second iron core 54 is opened. In this state, cleaning of the brazing filler metal rising gap 53 or other maintenance work can be easily done by inserting an elongated bar or plate into the brazing filler metal rising gap 53.

Providing the suction openings 56 near the bottom plate portion 34 at a sufficient distance from the surface of the brazing filler metal 32a, 32b, where oxides or other substances are floating, has an advantage in that oxides or other foreign substances will not easily be sucked into the suction openings 56 by accident. Even if oxides or other substances become lodged in a suction opening 56, they can be easily removed by inserting an elongated bar or the like into the brazing filler metal rising gap 53 without the need of taking the second iron core 54 or other components apart.

Furthermore, as the brazing filler metal 32a, 32b in a brazing filler metal rising gap 53 can be moved in the reverse direction, i.e. downward, by reversing the phase of the three-phase AC current fed to the induction coil 51, oxide or other substances caught in a suction opening 56 can be easily removed by means of back washing using the brazing filler metal which is ejected backward.

Figure 3:
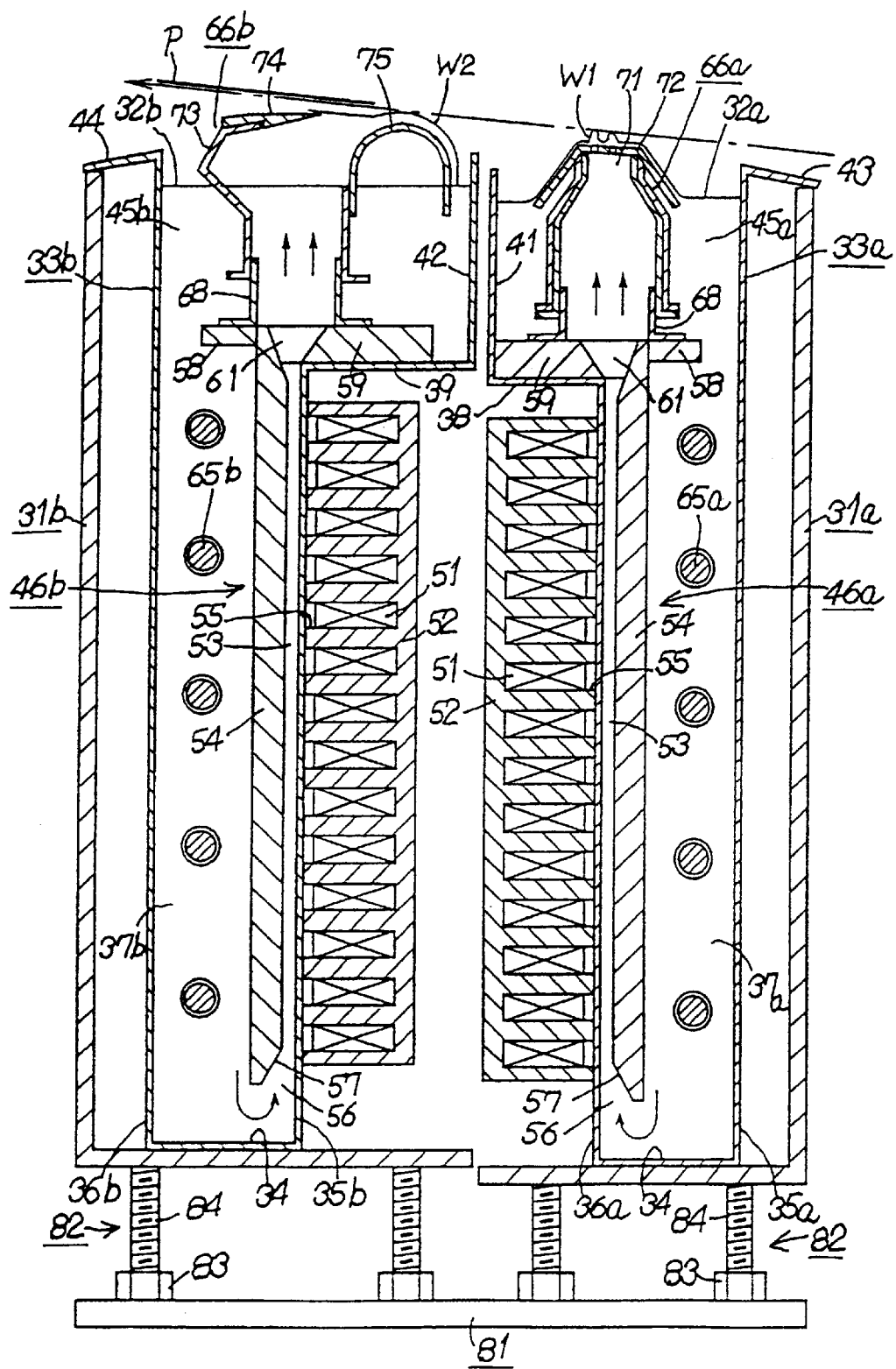
FIG. 3 is a sectional view of a brazing apparatus according to a second embodiment of the invention.

Next, the second embodiment of the invention is explained, referring to FIG. 3. The elements similar to those of the first embodiment shown in FIG. 1 are identified with the same reference numerals, of which explanation of the structures is omitted hereunder. As the function of the second embodiment is basically the same as that of the first embodiment, its explanation is also omitted.

The second embodiment has the same configuration as the first embodiment shown in FIG. 1 in that the first reservoir 33a and the second reservoir 33b are respectively provided with the first electromagnetic induction pump 46a and the second electromagnetic induction pump 46b. However, the locations of the electromagnetic induction pumps are different from those in the first embodiment.

As shown in FIG. 3, the horizontal plate portion 38 of the first reservoir 33a extends at an angle from the upper end of the vertical plate portion 36a at the workpiece outlet side in the direction in which the workpiece is conveyed. The horizontal plate portion 39 of the second reservoir 33b extends at an angle from the upper end of the vertical plate portion 35b at the workpiece inlet side toward the end of the device from which the workpiece is introduced.

The first electromagnetic induction pump 46a is formed by disposing a first iron core 52, around which an induction coil 51 is wound, in contact with the outer surface of the vertical plate portion 36a at the workpiece outlet side of the first reservoir 33a and disposing a second iron core 54 at the inner side of the vertical plate portion 36a with a brazing filler metal rising gap 53 therebetween.

The second electromagnetic induction pump 46b is formed by disposing a first iron core 52, around which an induction coli 51 is wound, in contact with the outer surface of the vertical plate portion 35b at the workpiece inlet side of the second reservoir 33b and disposing a second iron core 54 at the inner side of the vertical plate portion 35b with a brazing filler metal rising gap 53 therebetween.

The second electromagnetic induction pump 46b is formed by disposing a first iron core 52, around which an induction coil 51 is wound, in close contact with the outer surface of the vertical plate portion 35b at the workpiece inlet side of the second reservoir 33b and disposing a second iron core 54 at the inner side of the vertical plate portion 35b with a brazing filler metal rising gap 53 therebetween.

Figure 4:
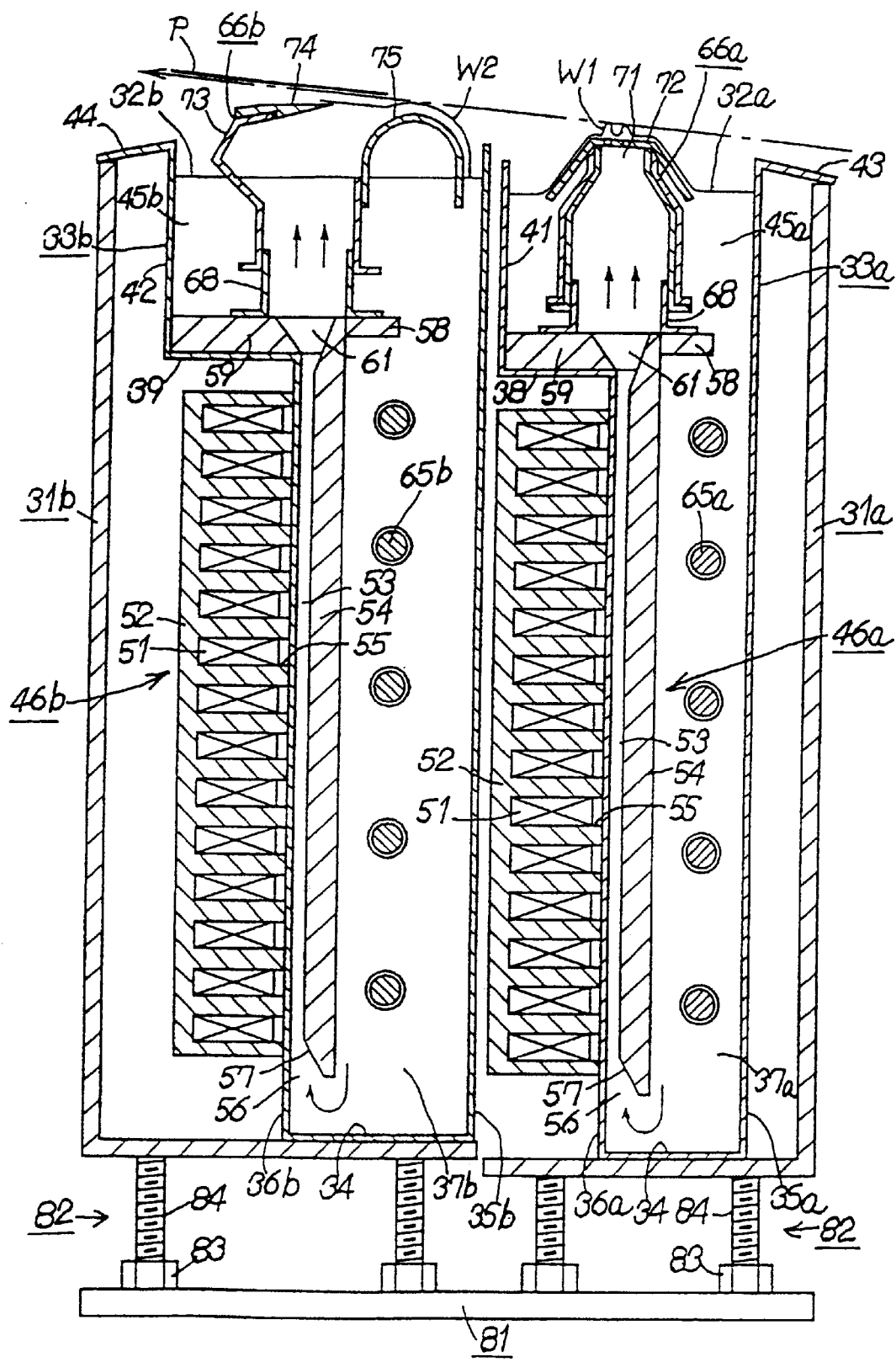
FIG. 4 is a sectional view of a brazing apparatus according to a third embodiment of the invention.

Next, the third embodiment of the invention is explained, referring to FIG. 4. The elements similar to those of the first embodiment shown in FIG. 1 are identified with the same reference numerals, of which explanation of the structures is omitted hereunder. As the function of the second embodiment is basically the same as that of the first embodiment, its explanation is also omitted.

The third embodiment has the same configuration as the first embodiment and the second embodiment in that the first reservoir 33a and the second reservoir 33b are respectively provided with the first electromagnetic induction pump 46a and the second electromagnetic induction pump 46b. However, the locations of the electromagnetic induction pumps are different from those in the first embodiment.

As shown in FIG. 4, the horizontal plate portion 38 of the first reservoir 33a extends at an angle from the upper end of the vertical plate portion 36a at the workpiece outlet side in the direction in which the workpiece is conveyed. The horizontal plate portion 39 of the second reservoir 33b extends at an angle from the upper end of the vertical plate portion 36b at the workpiece outlet side in the direction in which the workpiece is conveyed.

The first electromagnetic induction pump 46a vertically extends along the vertical plate portion 36a at the workpiece outlet side of the first reservoir 33a, while the second electromagnetic induction pump 46b vertically extends along the vertical plate portion 36b at the workpiece outlet side of the second reservoir 33b.

In other words, the first electromagnetic induction pump 46a is formed by disposing a first iron core 52, around which an induction coil 51 is wound, in contact with the outer surface of the vertical plate portion 36a at the workpiece outlet side of the reservoir 33a and disposing a second iron core 54 at the inner side of the vertical plate portion 36a with a brazing filler metal rising gap 53 therebetween.

The second electromagnetic induction pump 46b is formed by disposing a first core 52, around which an induction coli 51 is wound, in contact with the outer surface of the vertical plate portion 36b at the workpiece outlet side of the reservoir 33b and disposing a second iron core 54 at the inner side of the vertical plate portion 36b with a brazing filler metal rising gap 53 therebetween.

The second electromagnetic induction pump 46b is formed by disposing a first iron core 52, around which an induction coil 51 is wound, in close contact with the outer surface of the vertical plate portion 36b at the workpiece outlet side of the reservoir 33b and disposing a second iron core 54 at the inner side of the vertical plate portion 36b with a brazing filler metal rising gap 53 therebetween.

Although each brazing filler metal rising gap 53 is so formed as to extend vertically according to any one of the embodiments described above, it may be slightly angled as long as it extends nearly vertically.

Figure 5:
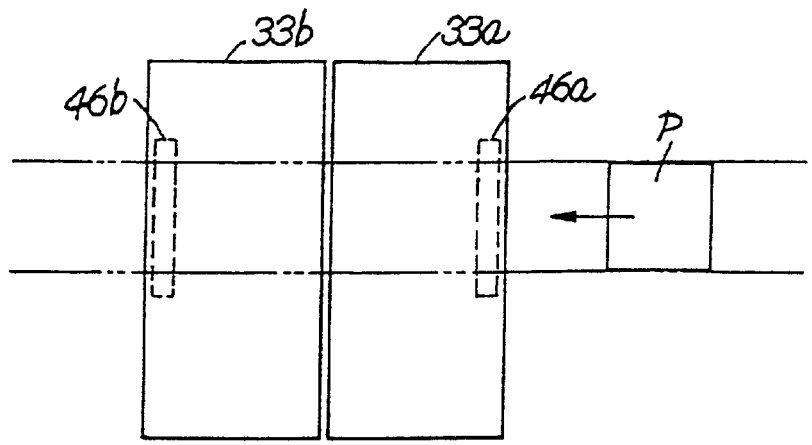
FIG. 5 is a top view of the brazing apparatus shown in FIG. 1 according to the first embodiment.
Figure 6:
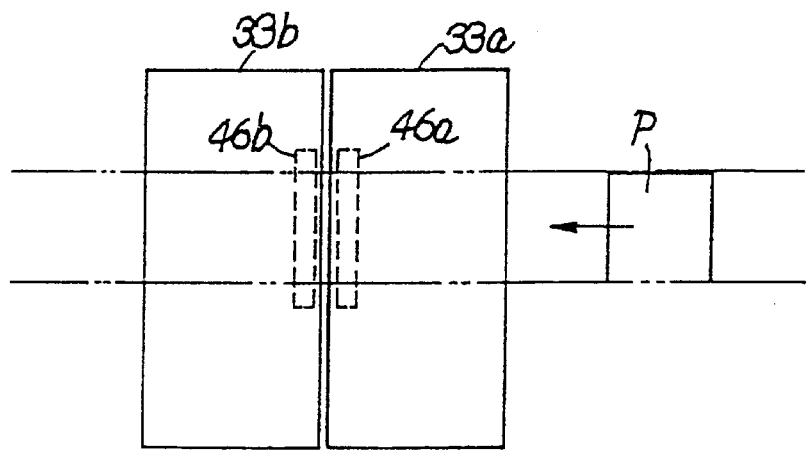
FIG. 6 is a top view of the brazing apparatus shown in FIG. 3 according to the second embodiment.

FIG. 5 is a top view of the first embodiment shown in FIG. 1, and FIG. 6 is a top view of the second embodiment shown in FIG. 3. In both embodiments, the first electromagnetic induction pump 46a or the second electromagnetic induction pump 46b vertically extends along a vertical plate portion located either at the workpiece inlet side or the workpiece outlet side of the first reservoir 33a or the second reservoir 33b. However, the present invention does not restrict where to install the electromagnetic induction pumps 46a, 46b to the locations specified by the above embodiments.

Figure 7:
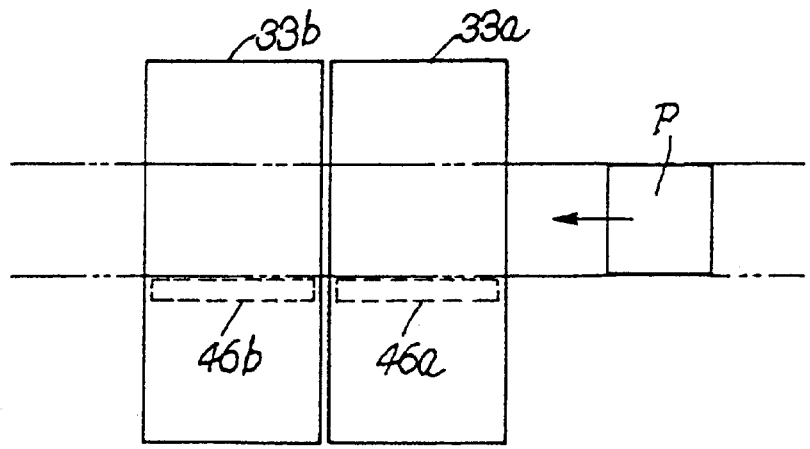
FIG. 7 is a top view of a brazing apparatus according to a fourth embodiment of the invention.
Figure 8:
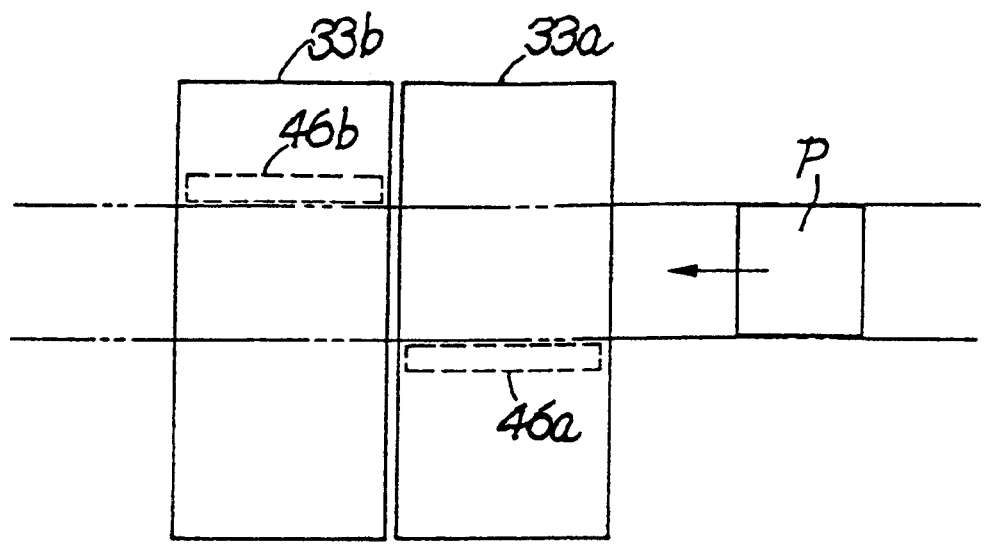
FIG. 8 is a top view of a brazing apparatus according to a fifth embodiment of the invention.
Figure 9:
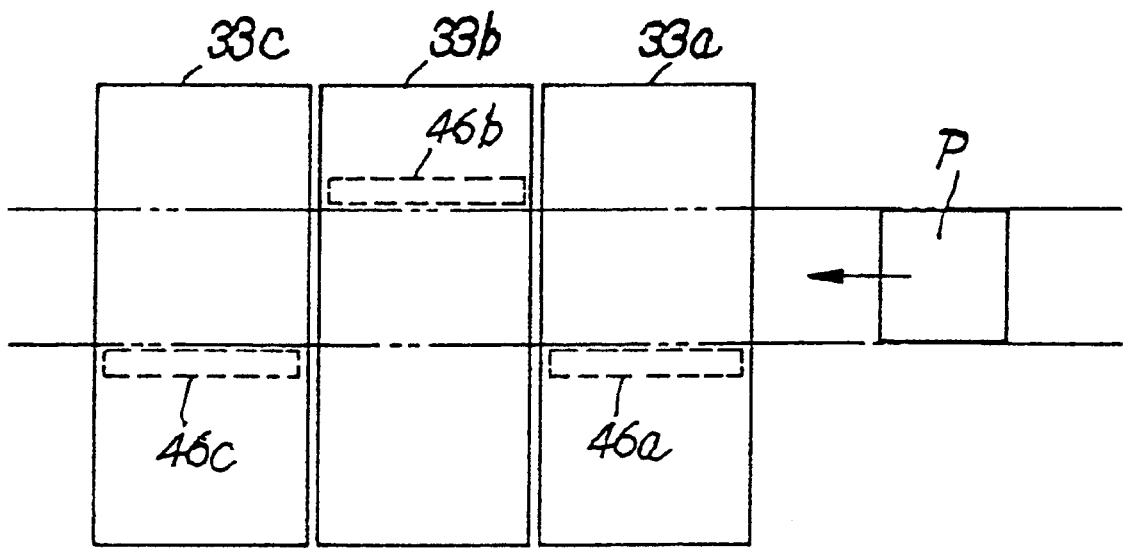
FIG. 9 is a top view of a brazing apparatus according to a sixth embodiment of the invention.

For example, embodiments shown in FIGS. 7 through 9, wherein each electromagnetic induction pump extends along a vertical plate portion located on either the right or the left of the predetermined workpiece conveyance path is also included in the present invention.

FIG. 7 shows the fourth embodiment of the present invention, wherein, of the vertical plate portions that constitute the first reservoir 33a and the second reservoir 33b, the vertical plate portions along which the first electromagnetic induction pump 46a and the second electromagnetic induction pump 46b respectively extend in the vertical direction are located at the same side, which is either on the right or the left of the workpiece conveyance path.

FIG. 8 shows the fifth embodiment of the present invention, wherein, of the vertical plate portions that constitute the first reservoir 33a, the vertical plate portion along which the first electromagnetic induction pump 46a extends vertically is located on the left of the predetermined path for conveyance of workpiece, while the second electromagnetic induction pump 46b extends vertically along the vertical plate portion located on the right of the workpiece conveyance path from among the vertical plate portions that constitute the second reservoir 33b.

FIG. 9 shows the sixth embodiment of the present invention, wherein a third reservoir 33c is provided in addition to the first reservoir 33a and the second reservoir 33b shown in FIG. 8, the three reservoirs arranged along the path of workpiece.

According to this embodiment, too, a third electromagnetic induction pump 46c may be conveniently disposed in such a manner as to vertically extend along a vertical plate portion, which is one of the vertical plate portions that constitute the third reservoir 33c and located on either the right or the left of the predetermined path of workpiece.

According to the embodiments shown in FIGS. 7 through 9, the reservoirs 33a, 33b, 33c are respectively provided with electromagnetic induction pumps 46a, 46b, 46c, each of which extends along a vertical plate portion at either side of the associated reservoir. However, each or any one of the reservoirs may be provided with a pair of electromagnetic induction pumps 46a, 46b or 46c which respectively extend along the right and left vertical plate portions. In this case, heaters may be inserted in the workpiece conveyance direction.

In a structure which includes three or more reservoirs like the embodiment shown in FIG. 9, too, electromagnetic induction pumps 46a, 46b, 46c may extend along the vertical plate portions located at either the workpiece inlet side or the workpiece outlet side of the respective reservoirs 33a, 33b, 33c.

As described above, the invention permits a plurality of electromagnetic induction pumps 46a, 46b to be arranged compactly, without taking up much space, in such a manner as to extend vertically along vertical plate portions 35a, 35b, 36a, 36b of a plurality of reservoirs 33a, 33b, and, by forming different types of overflow waves W1, W2 by means of these electromagnetic induction pumps 46a, 46b, the invention ensures highly reliably brazing even if workpieces are printed circuit boards with chip components packaged on the surface thereof with a high density. Furthermore, depending on waveforms or other characteristic requirements, brazing filler metals of different materials may be contained in the respective reservoirs 33a, 33b.

Vertically extending pump reservoir portions 37a, 37b are formed at the lower parts of the respective reservoirs 33a, 33b, while wave forming reservoir portion 45a, 45b are formed at the upper parts of the reservoirs 33a, 33b. As the pump reservoir portions 37a, 37b can thus be made elongated vertically while ensuring a given horizontal area necessary for the wave forming reservoir portion 45a, 45b, the quantity of brazing filler metal to be contained in the reservoirs 33a, 33b can be reduced. Therefore, the invention is especially suitable for cases where an expensive brazing filler metal which contains no lead is used. In addition, as the pump reservoir portions 37a, 37b of the reservoirs 33a, 33b are vertically elongated, there is less danger for oxides floating on the surface of the brazing filler metal be sucked into the electromagnetic induction pumps 46a, 46b. Therefore, the invention is also effective in preventing the oxides from plugging the pumps or causing brazing defects.

As the first iron cores 52 having induction coils 51 wound therearound are disposed outside the reservoirs 33a, 33b, maintenance of the induction coils or a similar operation can be easily done from outside.

Another benefit of the invention lies in that reservoirs 33a, 33b are individually provided with heaters 65a, 65b, the temperatures of the brazing filler metal in the reservoirs 33a, 33b can be respectively and independently controlled depending on waveforms or other conditions.

As the nozzles 66a, 66b are removably attached to the upper parts of the respective electromagnetic induction pumps 46a, 46b, maintenance of the nozzles themselves or cleaning work, such as removing from above oxides lodged in the electromagnetic induction pumps 46a, 46b, can be easily done by removing the nozzles 66a, 66b.

The height of at least one of the reservoirs 33a, 33b can be adjusted by means of a height adjusting means 82. Therefore, in cases where the inclination of the workpiece conveyance path has been changed or where such an adjustment has otherwise become necessary, distances between workpiece P and waves W1, W2 can be adjusted by changing the difference between the heights of the reservoirs 33a, 33b or changing the absolute height of the reservoir 33a and/or 33b.

Figure 10:
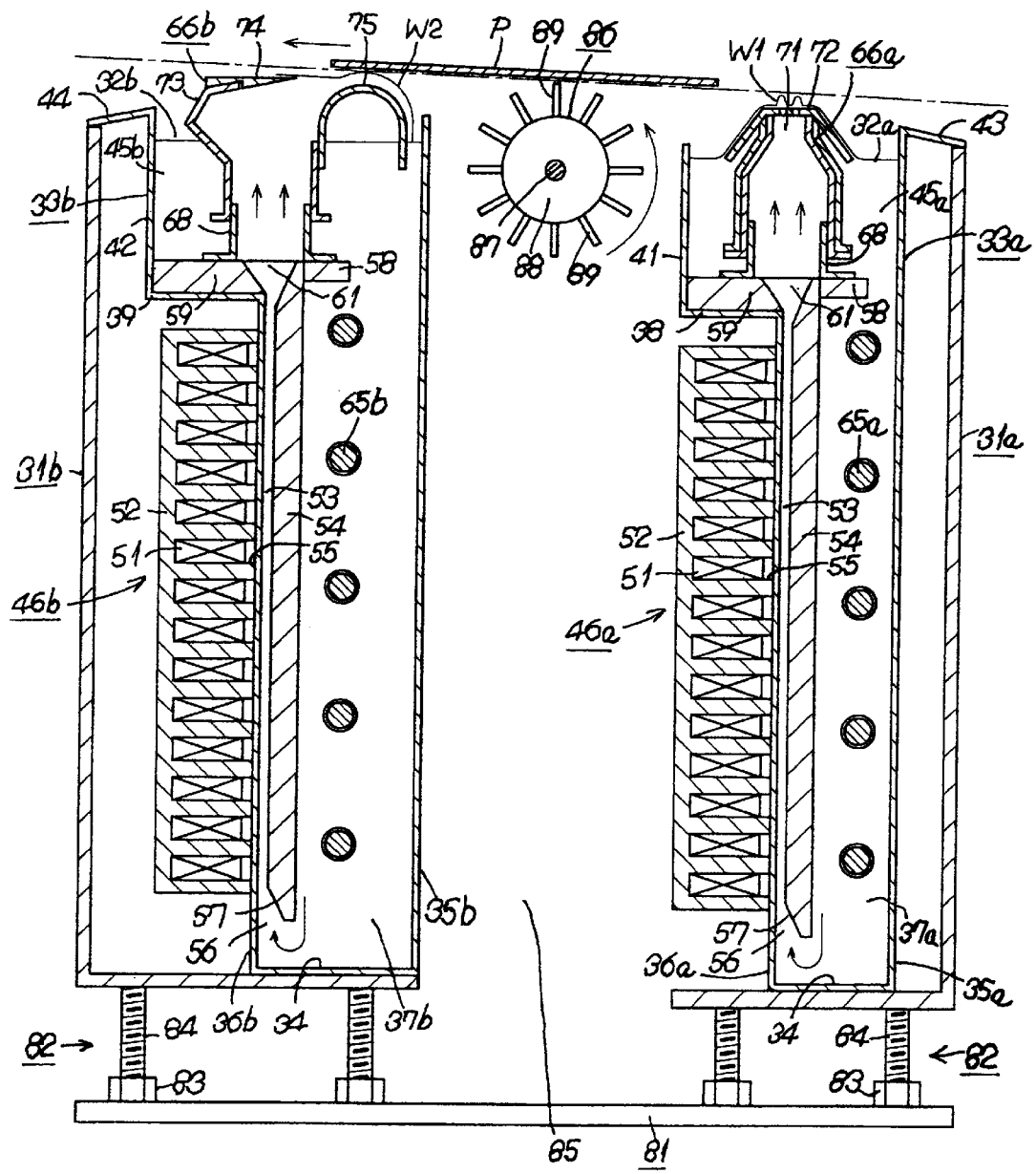
FIG. 10 is a sectional view of a brazing apparatus according to a seventh embodiment of the invention.

FIG. 10 shows the seventh embodiment of the present invention, wherein the apparatus is similar to that of embodiment three shown in FIG. 4. As shown in FIG. 10, a first device body 31a is disposed on the base 81, toward one of the lateral sides of the base 81. The height of the first device body 31a can be adjusted by a height adjusting means 82. A second device body 31b is disposed on the base 81, toward the other side of base 81. The height of the second device body 31b can be adjusted by a height adjusting means 82.

The two device bodies, 31a and 31b, are arranged along and below the conveying path, which is a predetermined path for conveying workpieces. Device body 31a located at the workpiece inlet side is provided with a vertically elongated first reservoir 33a adapted to contain brazing filler metal. Device body 31b located at the workpiece outlet side is provided with a vertically elongated second reservoir 33b adapted to contain brazing filler metal. The first and second reservoirs 33a and 33b, are two individual separated bodies, with the second reservoir 33b located downstream from the first reservoir 33a.

An intermediate space 85 is provided between the first reservoir 33a and the second reservoir 33b. Since each reservoir 33a, 33b has a vertically elongated shape, a sufficiently large intermediate space 85 can be ensured between the two reservoirs, 33a 3b.

A warp correcting device 86 that functions as an intermediate processing device adapted to process workpieces P is disposed in the upper part of the intermediate space 85. The warp correcting device 86 serves to correct downward warping of workpieces P. The warp correcting device 86 has a disk-shaped rotor 88, which is rotatably supported by a shaft 87 supported by bearings (not shown). Numerous warp correcting pins 89 radially project from the circumferential surface of the rotor 88.

The first reservoir 33a is provided with a first electromagnetic induction pump 46a, which extends vertically along the first reservoir 33a and serves to pump up the brazing filler metal 32a contained in the first reservoir 33a to the upper part of the first reservoir 33a. The second reservoir 33b is provided with a second electromagnetic induction pump 46b, which extends vertically along the second reservoir 33b and serves to pump the brazing filler metal 32b contained in the second reservoir 33b to the upper part of the second reservoir 33b.

A first nozzle 66a adapted to eject the brazing filler metal 32a that has been pumped up by the first electromagnetic induction pump 46a toward a workpiece P is disposed above the first electromagnetic induction pump 46a. A second nozzle 66b adapted to eject the brazing filler metal 32b that has been pumped up by the second electromagnetic induction pump 46b toward a workpiece P is disposed above the second electromagnetic induction bump 46b.

By ejecting the brazing filler metal 32a from the first nozzle 66a, primary waves W1 are formed in the shape of protrusions that move irregularly. The primary waves ensure excellent wettability of every brazed portion of a workpiece P. The workpiece P then passes the warp correcting device 86 and is carried into smooth, arc-shaped secondary waves W2, which smooth out excessive brazing, thereby preventing defects such as so-called bridges, icicles, etc.

Figure 16:
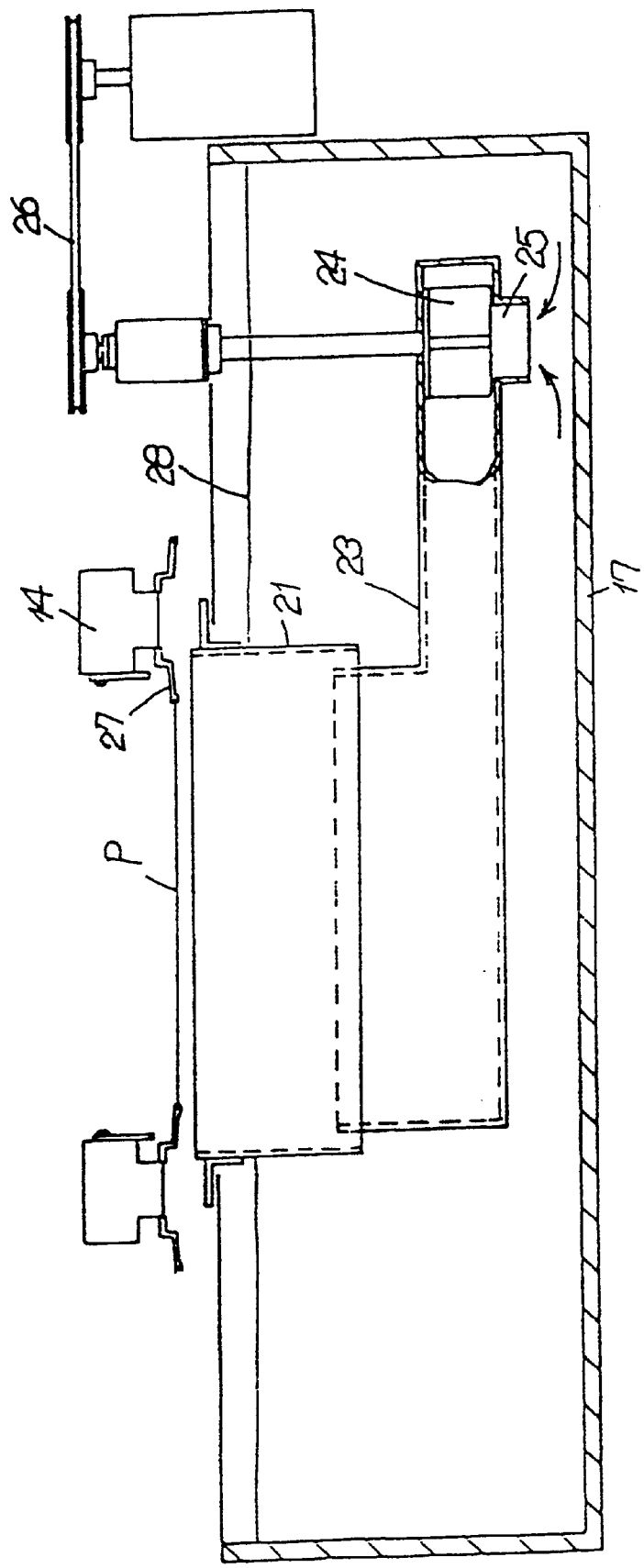
FIG. 16 is a sectional view of a solder bath of a conventional wave soldering device.

As shown in FIG. 16, a workpiece (i.e. printed board) P is carried by a pair of endless chains, which constitute a work conveyor, in such a manner that conveyor claws protruding from each endless chain hook and secure the corresponding end of the workpiece P. As a result, there is the possibility of warping of the workpiece P, with its center portion curved downward due to heat or the weight of the workpiece itself.

The warp correcting device 86 is provided in order to solve this problem; the warped workpiece P is carried toward a location above the second nozzle 66b by the work conveyor, while the warp correcting pins 89 of the warp correcting device 86, which is disposed in the upper part of the intermediate space 85, push the center portion of the workpiece P upward, thereby straightening out the warped portion of the workpiece P. As the location above the second nozzle 66b, secondary waves W2 spouted from the second nozzle 66b smooth out excessive brazing of the workpiece P and reform defects such as so-called bridges, icicles, etc.

With the movement of the workpiece P, the warp correcting pins 89 revolve around the shaft 87 while touching the workpiece P so that new pins come successively into contact with the workpiece P.

Figure 11:
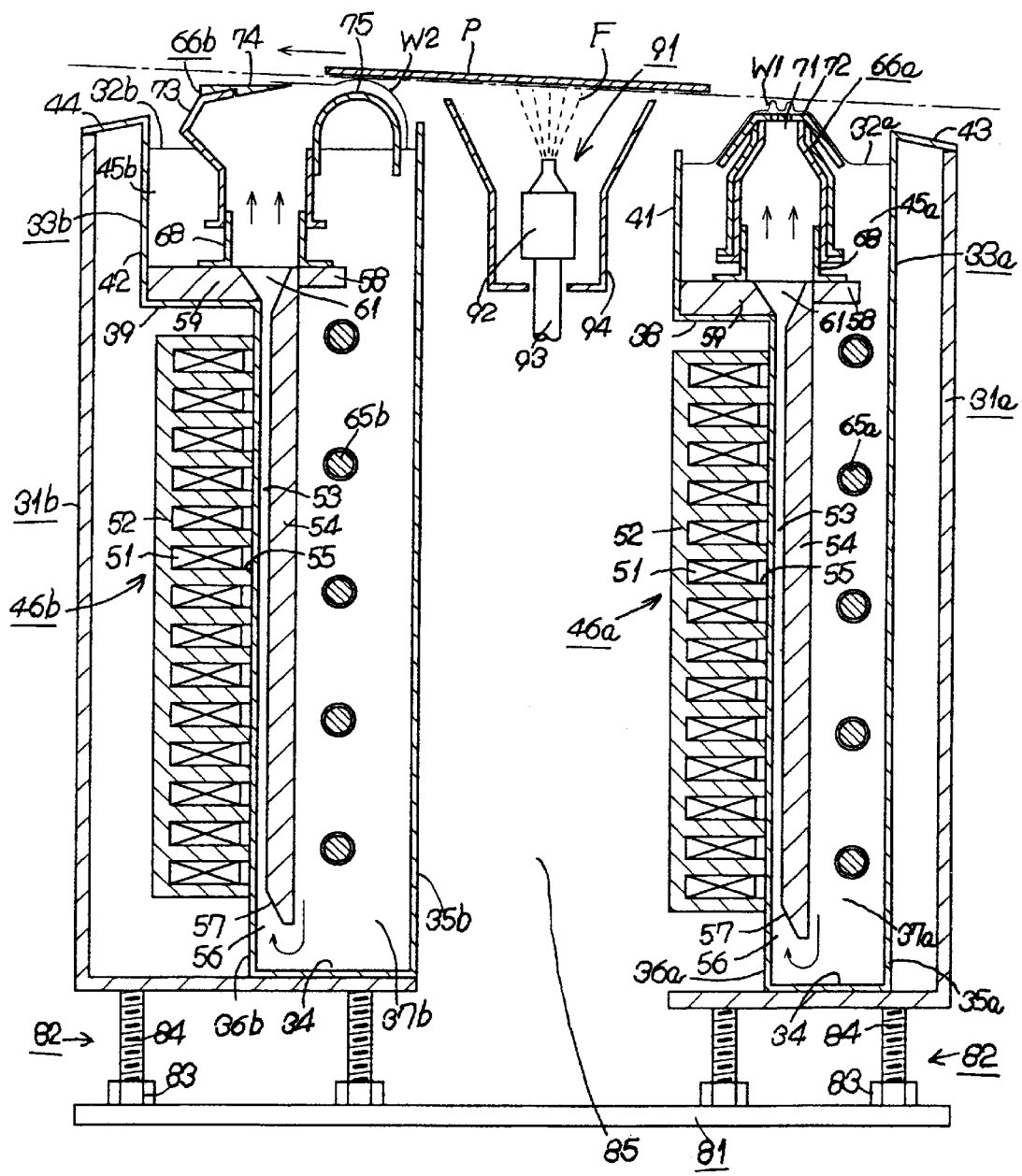
FIG. 11 is a sectional view of a brazing apparatus according to an eighth embodiment of the present invention.

FIG. 11 shows an eighth embodiment of a brazing device according to the invention. As is true in the embodiment of FIG. 10, the eighth embodiment is provided with an intermediate space 85 between the first reservoir 33a and the second reservoir 33b. In the eighth embodiment, however, a flux applying device 91 disposed in the upper part of the intermediate space 85 serves as an intermediate processing device.

The flux applying device 91 includes a flux nozzle 92 for ejecting flux, a piping 93 for supplying the flux nozzle 92 with flux, and a flux receiving plage 94 surrounding the flux nozzle. The flux nozzle 92 is position so as to face the underside of a workpiece P that is being carried above the flux applying device 91.

Should the flux applied to the workpiece P beforehand be excessively reduced as a result of the brazing of the workpiece P by primary waves W1 ejected from the first nozzle 66a, flux F is sprayed from the flux nozzle 92 of the flux applying device 91 onto the workpiece P so as to make up for the shortage of the flux. After the flux F is thus applied to the underside of the workpiece P, the work conveyor carries the workpiece P to a location above the second nozzle 66b, where secondary waves W2 ejected from the secondary nozzle 66b adjust the shape of the brazed portions of the workpiece P.

Other examples of an intermediate processing device disposed in the aforementioned intermediate space 85 include a heater adapted to preheat a workpiece P prior to its contact with secondary waves W2.

Figure 12:
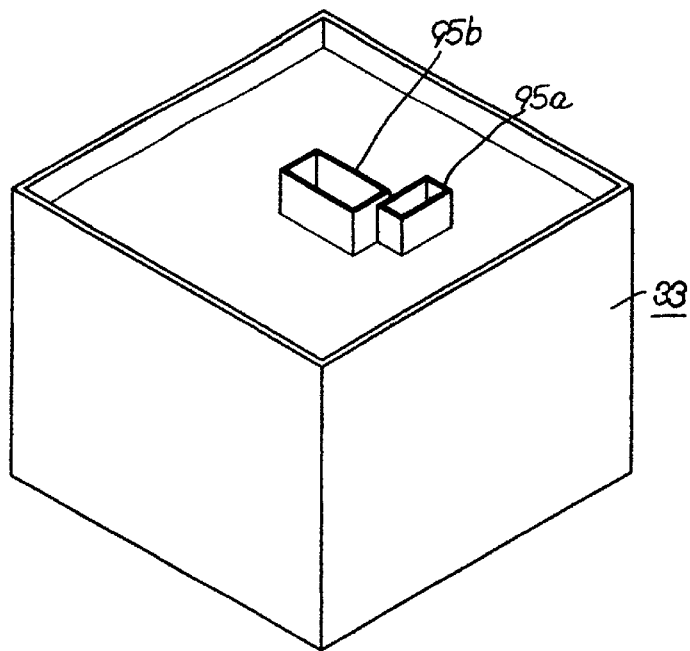
FIG. 12 is a perspective view showing a unit of brazing apparatus for local brazing.
Figure 14:
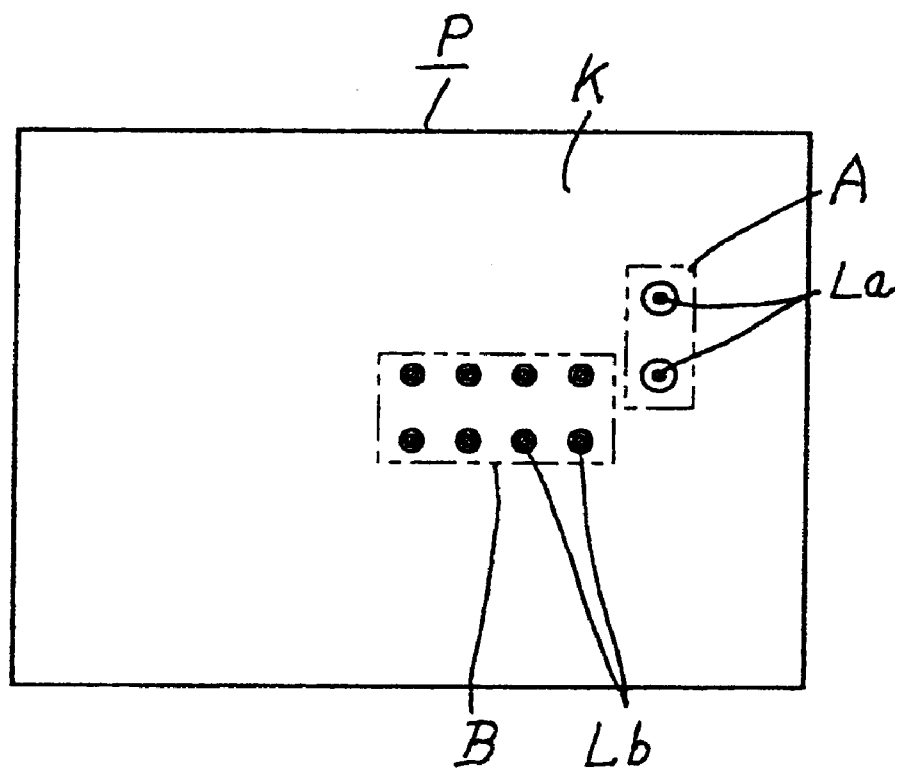
FIG. 14 is a top view of a workpiece which is brazed by a brazing apparatus for local brazing.
Figure 15:
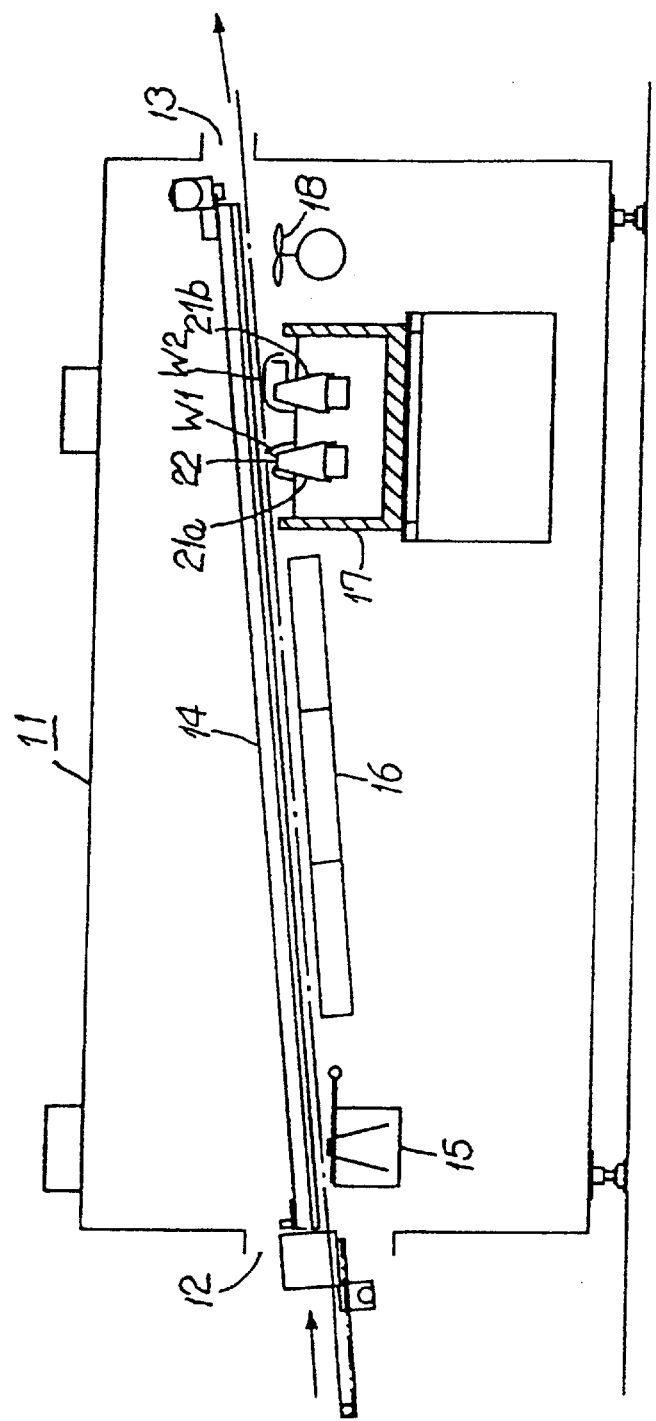
FIG. 15 is a schematic illustration of a conventional wave soldering device.

Referring to FIGS. 12 and 14, an integral body type local brazing device is shown, wherein a plurality of local nozzles 95a, 95b are arranged in close proximity to each other, at positions corresponding to a plurality of elements A, B, mounted in close proximity to each other on a printed board K as a workpiece.

When a printed board K as described above having no clearance between elements is brought close to the nozzles 95a, 95b for brazing, there is a high likelihood of interference between the local nozzles 95a, 95b and leads La, Lb of the elements A, B which are raised from the underside of the printed board K. There is also the possibility of interference occurring between spouts of the brazing filler metal ejected from the plurality of local nozzles 95a, 95b.

Figure 13:
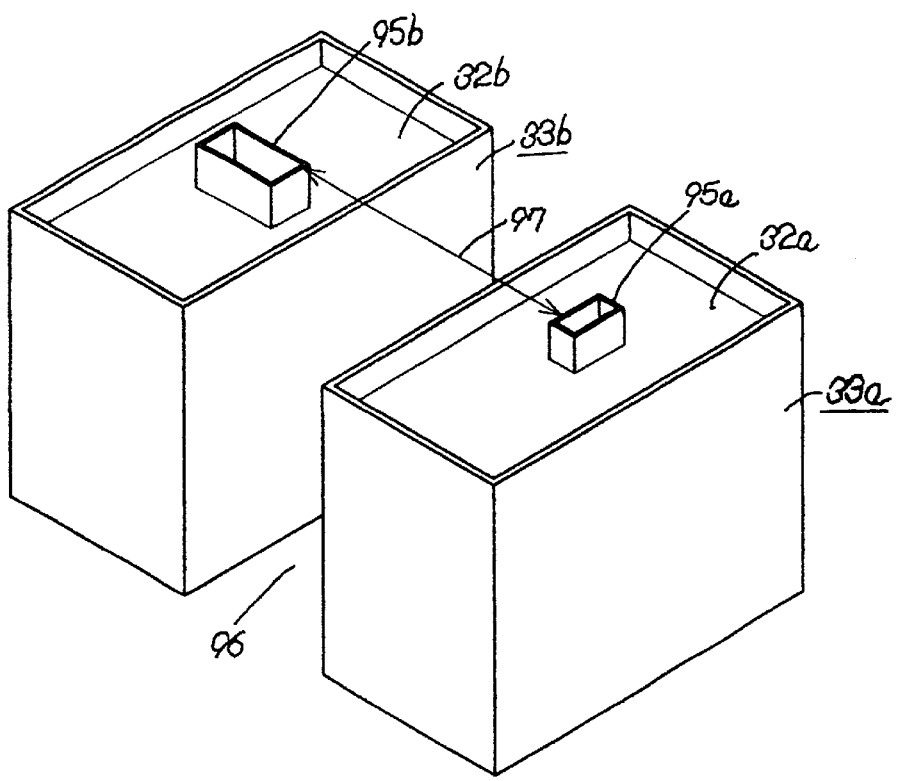
FIG. 13 is a sectional view of a brazing apparatus for local brazing according to an eighth embodiment of the invention.

In order to prevent the above problem, the local brazing device shown in FIG. 13 is provided with two individual reservoirs, i.e. the first reservoir 33a and the second reservoir 33b, which are spaced apart and arranged along the workpiece conveying path or along a horizontal line that is unrelated to the workpiece conveying path, with a given space 96 between the reservoirs 33a, 33b. The first reservoir 33a is provided with a first local nozzle 95a, while the second reservoir 33b is provided with a second local nozzle 95b that is separated from the first local nozzle 95a.

With the configuration as above, an interference preventing space 97 is provided between the first local nozzle 95a and the second local nozzle 95b so as to prevent interference between a workpiece P and either local nozzle 95a, 95b and also prevent interference between workpieces P that are respectively located above the first and second local nozzles 95a, 95b. The interference preventing space 97 may preferably have a width not narrower than a single printed board.

The first reservoir 33a and the second reservoir 33b may be arranged along the workpiece conveying path. However, the positions of the reservoirs are not limited to such an arrangement. For example, by using a workpiece transferring robot hand adapted to move a workpiece P between a given location above either reservoir 33a, 33b, it is possible to position the first reservoir 33a and the second reservoir 33b at locations that have no direct relation with the conveying path for workpieces P.

In the same manner as FIG. 10 or FIG. 11, a first electromagnetic induction pump (not shown) extends vertically along the first reservoir 33a shown in FIG. 13 and serves to pump up the brazing filler metal 32a contained in the first reservoir 33a to the upper part of the first reservoir 33a. The aforementioned first local nozzle 95a is provided as a guide conduit for moving the brazing filler metal 32a pressurized by the first electromagnetic induction pump upward so as to bring the brazing filler metal 32a into contact with the limited brazing areas on the surface of a workpiece P to be brazed. Likewise, a second electromagnetic induction pump (not shown) extends vertically along the second reservoir 33b in the same manner as FIG. 10 or FIG. 11 and serves to pump up the brazing filler metal 32b contained in the second reservoir 33b to the upper part of the second reservoir 33b. The aforementioned second local nozzle 95b is provided as a guide conduit for moving the brazing filler metal 32b pressurized by the second electromagnetic induction pump upward so as to bring the brazing filler metal 32b into contact with the limited brazing areas on the surface of a workpiece P to be brazed.

As the first reservoir 33a and the second reservoir 33b both have a vertically elongated shape, the present embodiment is capable of keeping the whole device compact while ensuring a sufficient space 96 between the two reservoirs 33a, 33b.

When conducting local brazing by a local brazing device shown in FIG. 13, a workpiece P is moved by a work conveyor, a workpiece transferring robot hand or any other appropriate means so that the brazing area corresponding to the first element A of the workpiece P shown in FIG. 14 is positioned above and brought close to the first local nozzle 95a projecting from the first reservoir 33a, and the brazing filler metal 32a, wihc has been moved upward inside the first local nozzle 95a due to the pressurization by the electromagnetic induction pump, into contact with the surface of the printed board, from which the leads La of the first element A protrude, so that the leads La of the first element A alone are brazed to the surface of the printed board.

Thereafter, the workpiece P is moved by the work conveyor, the workpiece transferring robot hand or the like, so that the brazing area corresponding to the second element B is positioned above and brought close to the second local nozzle 95b projecting from the second reservoir 33b, and the brazing filler metal 32b, which has been moved upward inside the second local nozzle 95b due to the pressurization by the corresponding electromagnetic induction pump, into contact with the surface of the board, from which the leads Lb of the second element B protrude, so that the leads Lb of the second element B alone are brazed to the surface of the printed board.

When local brazing of a workpiece P is conducted with the workpiece P positioned above the first local nozzle 95a, the interference preventing space 97 that is thus provided between the first local nozzle 95a and the second local nozzle 95b prevents interference between the workpiece P and the other local nozzle 95b, which is not being used for the current local brazing, and also prevents interference between spouts of the brazing filler metal ejected from the local nozzles 95a, 95b. The embodiment described above thus ensures reliable brazing of brazing areas of a plurality of elements A, B, that are positioned close to one another.

If there is a sufficiently large interference preventing space 97 between the local nozzles 95a, 95b, it is possible to increase the efficiency of brazing by simultaneously positioning a plurality of workpieces above the first local nozzle 95a and the second local nozzle 95b, respectively.

The present invention can be used not only for brazing chip components or the like mounted on the surface of a printed circuit board (i.e. in the manner of high-density packaging with brazing filler metal which contains no lead) but can also be used for soldering components to a substrate with a soldering material containing lead.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A brazing apparatus, comprising:
a first reservoir for holding a brazing filler metal, disposed along a predetermined conveyance path of a workpiece;
a second reservoir for holding a brazing filler metal, disposed adjacent to said first reservoir in a direction of travel of said workpiece;
a first nozzle disposed on and in communication with said first reservoir, for ejecting upwardly a first wave of said brazing filler metal from said reservoir;
a second nozzle disposed on and in communication with said second reservoir, for ejecting upwardly a second wave of said brazing filler metal from said second reservoir; and
means for adjusting the height of said first and second reservoirs to allow said height of each of said first and second reservoirs to be adjusted independently.

2. The brazing apparatus according to claim 1, further comprising:
a first electromagnetic induction pump attached to said first reservoir,
said first electromagnetic induction pump being effective to pump said brazing filler metal from said first reservoir to said first nozzle;
a second electromagnetic induction pump disposed about said second reservoir; and
said second electromagnetic induction pump being effective to pump said brazing filler metal from said second reservoir to said second nozzle.

3. A brazing apparatus acording to claim 2, wherein each electromagnetic induction pump includes:
a first iron core disposed in contact with an outer side face of a respective vertical plate portion;
an induction coil wound around said first iron core;
a second iron core disposed in parallel to an inner side face of said vertical plate portion; and
a brazing filler metal rising gap between the vertical plate portion and the second iron core.

4. The brazing apparatus according to claim 3, wherein said first reservoir further comprises a vertical plate having an outer surface, for mounting said first electromagnetic induction pump; and
said second reservoir further comprises a vertical plate having an outer surface, for mounting said second electromagnetic induction pump, wherein said first and second electromagnetic induction pumps are mounted on said outer surfaces of said vertical plates.

5. The brazing apparatus of claim 4, wherein said first nozzle is adapted to form a plurality of primary waves in said brazing filler metal ejected from said first nozzle; and
said second nozzle is adapted to form smooth secondary waves in said brazing filler metal ejected from said second nozzle.

6. The brazing apparatus of claim 5, wherein said first nozzle further comprises a wave-forming plate attached to a top of said first nozzle and a plurality of ejection holes disposed in said wave-forming plate;
said pluralty of ejection holes form a plurality of primary waves in said brazing filler metal ejected from said first nozzle;
said second nozzle further comprises a directing plate, a directing fin attached to said directing plate and a guide plate disposed about said directing fin; and
said directing plate, said directing fin, and said guide plate form smooth secondary waves in said brazing filler metal ejected from said second nozzle.

7. The brazing apparatus of claim 6, further comprising:
a first heater disposed in said first reservoir, for melting said brazing filler metal in said first reservoir; and
a second heater disposed in said second reservoir, for melting said brazing filler material in said second reservoir.

8. The brazing apparatus of claim 1, further comprising an intermediate space between said first reservoir and said second reservoir;
an intermediate processing device; and
said intermediate processing device is disposed in said intermediate space between said first reservoir and said second reservoir.

9. The brazing apparatus of claim 8, wherein said intermediate processing device is at least one of the group consisting of a warp correcting device and a flux applying device.

10. A brazing apparatus, comprising:
a first reservoir for holding a brazing filler metal;
said first reservoir being disposed underneath a workpiece to be brazed;
a second reservoir for holding a brazing filler metal;
said second reservoir being disposed adjacent to said first reservoir;

a first local nozzle disposed on and in communication with said first reservoir, for ejecting upwardly a first wave of said brazing filler metal from said first reservoir;

a second local nozzle disposed on and in communication with said second reservoir, for ejecting upwardly a second wave of said brazing filler metal from said second reservoir;

an interference preventing space between said first and said second local nozzles being effective to prevent interference between said workpiece and said local nozzles and between multiple workpieces being brazed simultaneously;

means for adjusting the height of said first and second reservoirs to allow said height of each of said first and second reservoirs to be adjusted independently; and means for adjusting the position of said workpiece relative to said first and said second reservoirs.

11. A brazing apparatus according to claim 10, wherein said brazing apparatus further comprises an interference preventing space;

said interference preventing space being between said first local nozzle and said second local nozzle and effective to prevent interference between said first and said second local nozzles and said workpiece.

12. A brazing apparatus according to claim 11, wherein said means for adjusting said position of said workpiece is a robot hand.

13. A brazing apparatus, comprising:

a pluralty of reservoirs for holding a brazing filler metal;

said pluralty of reservoirs being disposed sequentially along a predetermined conveyance path of a workpiece;

a pluralty of nozzles;

each of said pluralty of nozzles being disposed on and in communication with a corresponding reservoir from said pluralty of reservoirs; and means for adjusting the height of said pluralty of reservoirs to allow said height of each of said pluralty of reservoirs to be adjusted independently.

* * * * *